(12) United States Patent
Kinsey et al.

(10) Patent No.: US 7,286,046 B2
(45) Date of Patent: Oct. 23, 2007

(54) SYSTEMS AND METHODS FOR SUPPLYING POWER TO A VEHICLE TRAILER

(75) Inventors: Gregory William Kinsey, Culver City, CA (US); John D. Jacobs, Brea, CA (US)

(73) Assignee: R.A. Phillips Industries, Inc., Santa Fe Springs, CA (US)

( * ) Notice: Subject to any disclaimer, the term of this patent is extended or adjusted under 35 U.S.C. 154(b) by 402 days.

(21) Appl. No.: 11/141,242

(22) Filed: May 31, 2005

(65) Prior Publication Data

US 2006/0267746 A1 Nov. 30, 2006

(51) Int. Cl.
*G08B 21/00* (2006.01)
(52) U.S. Cl. ............... 340/431; 340/468; 340/479; 340/472; 303/123; 307/9.1; 439/35; 439/36
(58) Field of Classification Search ............... 340/431, 340/467, 468, 471, 479, 450.1, 458, 472, 340/641, 687, 453, 310.11; 303/20, 123, 303/124; 180/275; 307/9.1, 10.1, 10.8; 701/36, 70; 439/35, 36
See application file for complete search history.

(56) References Cited

U.S. PATENT DOCUMENTS

| | | | | |
|---|---|---|---|---|
| 5,775,712 A | * | 7/1998 | Link et al. | 280/422 |
| 5,990,788 A | * | 11/1999 | Syracuse | 340/458 |
| 6,512,452 B1 | * | 1/2003 | Brannan et al. | 340/431 |
| 6,799,814 B2 | * | 10/2004 | Lesesky et al. | 303/122.02 |
| 6,879,251 B2 | * | 4/2005 | Robbins et al. | 340/471 |
| 6,970,772 B2 | * | 11/2005 | Radtke et al. | 701/1 |

OTHER PUBLICATIONS

Grote Industries: Product #44000—Gray, Trailer Air Switch Module, http://www.grote.com/cgi-bin/product.cgi?product_number=44000&mode=print (1 pg.), Jun. 1, 2005.
Grote Industries: Product #44001—Gray, Trailer Air and Relay Switch Module, http://www.grote.com/cgi-bin/product.cgi?product_number=44001&mode=print (1 pg.), Jun. 1, 2005.
Grote Industries: Product #44002—Gray, Trailer Relay Switch Module, http://www.grote.com/cgi-bin/product.cgi?product_number=44002&mode=print (1 pg.), Jun. 1, 2005.
Grote Industries: Product #44240—Full Feature, Surface Mount, Electronic Dome Lamp Switch, http://www.grote.com/cgi-bin/product.cgi?product_number=44240&mode=print (1 pg.), Jun. 1, 2005.

* cited by examiner

*Primary Examiner*—Davetta W. Goins
(74) *Attorney, Agent, or Firm*—Jones Day

(57) ABSTRACT

In accordance with the teachings described herein, systems and methods are provided for supplying power to a vehicle trailer. A connection device may be used to connect the vehicle trailer to a vehicle power line and to a control line from a vehicle electrical system. The trailer may include a main trailer electrical system and an auxiliary trailer electrical system. The main trailer electrical system requires power only when the vehicle trailer is in motion, and may be coupled to the connection device to receive power from the vehicle power line. A control unit may be coupled to the connection device, and may receive a control signal from the control line. The control unit may be used to switchably couple the auxiliary trailer electrical system to the vehicle power line based on the control signal.

23 Claims, 8 Drawing Sheets

US 7,286,046 B2

SYSTEMS AND METHODS FOR SUPPLYING POWER TO A VEHICLE TRAILER

FIELD

The technology described in this patent document relates generally to the field of vehicle power systems. More particularly, systems and methods are provided for supplying power to a vehicle trailer.

BACKGROUND

Trailers used in the heavy duty trucking market are frequently fitted with interior cargo lights to provide drivers with enough light to safely move around the inside of the trailer when the vehicle is parked. The interior cargo lights are typically powered from the vehicle's alternator via a junction box on the front of the trailer. The typical output of a tractor trailer alternator is around 14 VDC, but the voltage available at the junction box is typically no higher than around 12.5 VDC. There exists a problem in today's market to get as much of that voltage to the interior cargo lights as possible. When the vehicle is in motion, however, the power supplied by the junction box blue wire is mandated as the power supply to the trailer's antilock braking system (ABS) control module.

In order to supply power to the interior cargo lights only when the vehicle is not in motion, prior systems insert a pressure controlled switch into the trailer's emergency air brake line. When there is no pressure in the emergency air brake line, the parking brakes are engaged, and the pressure controlled switch allows power from the junction box to be supplied to the interior cargo lights. The pressure controlled switches used in prior systems, however, are high current devices that cause a drop in the voltage available from the junction box, translating to less voltage that is available to supply the interior cargo lights. It would be advantageous, therefore, to provide a means for supplying power from the junction box to the interior cargo lights that eliminates the high current switch used in prior systems.

SUMMARY

In accordance with the teachings described herein, systems and methods are provided for supplying power to a vehicle trailer. A connection device may be used to connect the vehicle trailer to a vehicle power line and to a control line from a vehicle electrical system. The trailer may include a main trailer electrical system and an auxiliary trailer electrical system. The main trailer electrical system requires power only when the vehicle trailer is in motion, and may be coupled to the connection device to receive power from the vehicle power line. A control unit may be coupled to the connection device, and may receive a control signal from the control line. The control unit may be used to switchably couple the auxiliary trailer electrical system to the vehicle power line based on the control signal.

DETAILED DESCRIPTION

Figure 1:
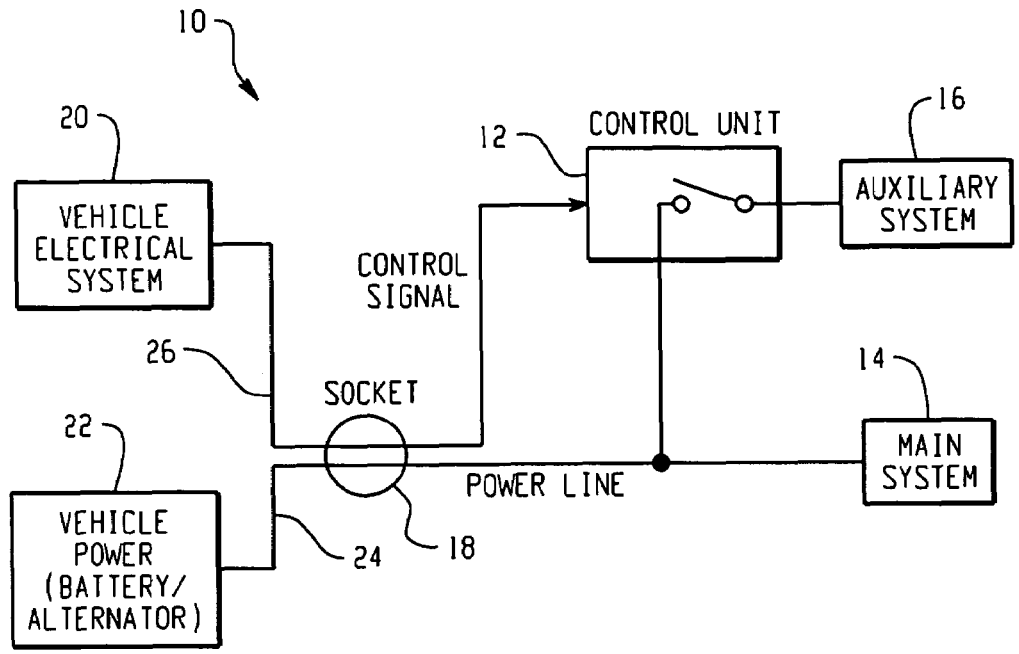
FIG. 1 is a block diagram of an example system for supplying power to a vehicle trailer.

FIG. 1 is a block diagram of an example system 10 for supplying power to a vehicle trailer. The system 10 includes a control unit 12, a main trailer electrical system 14, an auxiliary trailer electrical system 16 and a connection device 18. Also illustrated are a vehicle electrical system 20 and a vehicle power supply system 22.

The connection device 18 is configured to connect the vehicle trailer to a vehicle power line 24 from the vehicle power system 22 and to a control line 26 from the vehicle electrical system 20. The connection device 18 may, for example, be a SAE J560 socket in the junction box of a trailer, but could also be another suitable connection device. The vehicle power system 22 may, for example, include the alternator and battery in a tractor that generates around 14 VDC on the vehicle power line 24. The vehicle electrical system 20 may be an electrical system in a tractor and/or trailer that is configured to generate a control signal which is indicative of whether the tractor-trailer is currently in motion or will soon be in motion. For example, the vehicle electrical system 20 may include a brake light circuit that generates a brake light signal when the vehicle's brake pedal is depressed. In another example, the vehicle electrical system 20 may include a vehicle speed sensor that generates a control signal indicating the speed of the vehicle. In yet another example, the vehicle electrical system 20 may include all or part of the main trailer electrical system 14, for instance a control signal indicating the vehicle's current speed may be obtained from the trailer's ABS control module.

The main trailer electrical system 14 is coupled to the connection device 18 and receives power from the vehicle power line 24. The main trailer electrical system 14 may include one or more electrical systems in the trailer that require power when the trailer is in motion. For example, the main trailer electrical system 14 may include the trailer's ABS control module. The auxiliary trailer electrical system 16 may include one or more electrical systems in the trailer that only require power when the vehicle is not in motion, for example the trailer's interior cargo lights.

The control unit 12 is coupled to the connection device 18 and receives a control signal from the control line 26, and switchably couples the auxiliary trailer electrical system 16 to the vehicle power line 24 based on the control signal. The control unit 12 may disconnect power from the auxiliary trailer electrical system 16, allowing full power to the main trailer electrical system, when the control signal indicates that the trailer is in motion or is about to be in motion. The control unit 12 may, for example, include one or more relays or other controlled switching devices. In one example, the control unit 12 may also include a timing circuit that automatically disconnects power from the auxiliary trailer electrical system 16 after a timer period has expired.

If the vehicle electrical system 20 is a brake light circuit, then the control unit 12 may, for example, be configured to disconnect the auxiliary trailer electrical system 16 from the vehicle power line when the brake light signal is activated (e.g., when the driver depresses the brakes before putting the vehicle in gear). In another example, if the vehicle electrical system 20 includes a vehicle speed sensor, then the control unit 12 may be configured to disconnect the auxiliary trailer electrical system 16 from the vehicle power line when the control signal indicates that the vehicle is in motion (e.g., indicates a speed greater than zero).

Figure 2:
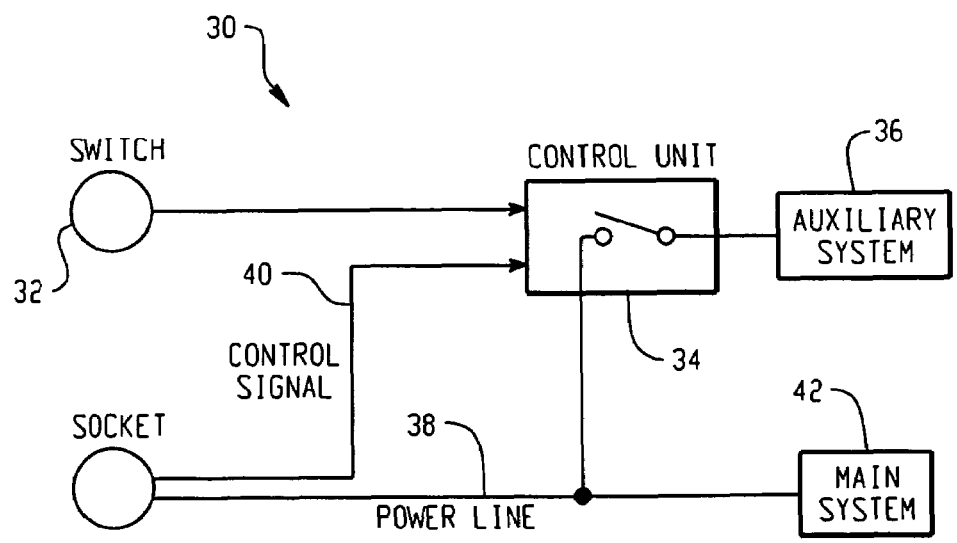
FIG. 2 is a block diagram of another example system for supplying power to a vehicle trailer.

FIG. 2 is a block diagram of another example system 30 for supplying power to a vehicle trailer. In this example, the system 30 also includes an auxiliary power switch 32 coupled to the control unit 34, and the control unit 34 is configured to switchably couple the auxiliary trailer electrical system 36 to the vehicle power line 38 based on both the control signal 40 and a signal from the auxiliary power switch 32. The auxiliary power switch 32 may be a momentary switch or a non-momentary switch. An example momentary switch may be activated by pressing the switch a first time and deactivated by pressing the switch a second time. An example non-momentary switch may be activated and deactivated by opening or closing the switch.

In operation, the control unit 34 connects the auxiliary trailer electrical system 36 to the vehicle power line 38 when the auxiliary power switch 32 is activated, provided that the control signal 40 does not indicate that the vehicle is in motion or is about to be in motion. The control unit 34 then disconnects the auxiliary trailer electrical system 36 from the vehicle power line 38, providing full power to the main trailer electrical system 42, if either the switch 32 is deactivated or the control signal 40 indicates that the vehicle is in motion or is about to be in motion.

For example, if the vehicle electrical system is a brake light circuit, then the control unit 34 may connect the auxiliary trailer electrical system 36 to the vehicle power line 38 when the switch 32 is activated, provided that the brake light signal 40 is not activated. The auxiliary trailer electrical system 36 is then disconnected from the power line 38 when either the switch 32 is deactivated or the brake light signal 40 is activated.

Figure 3:
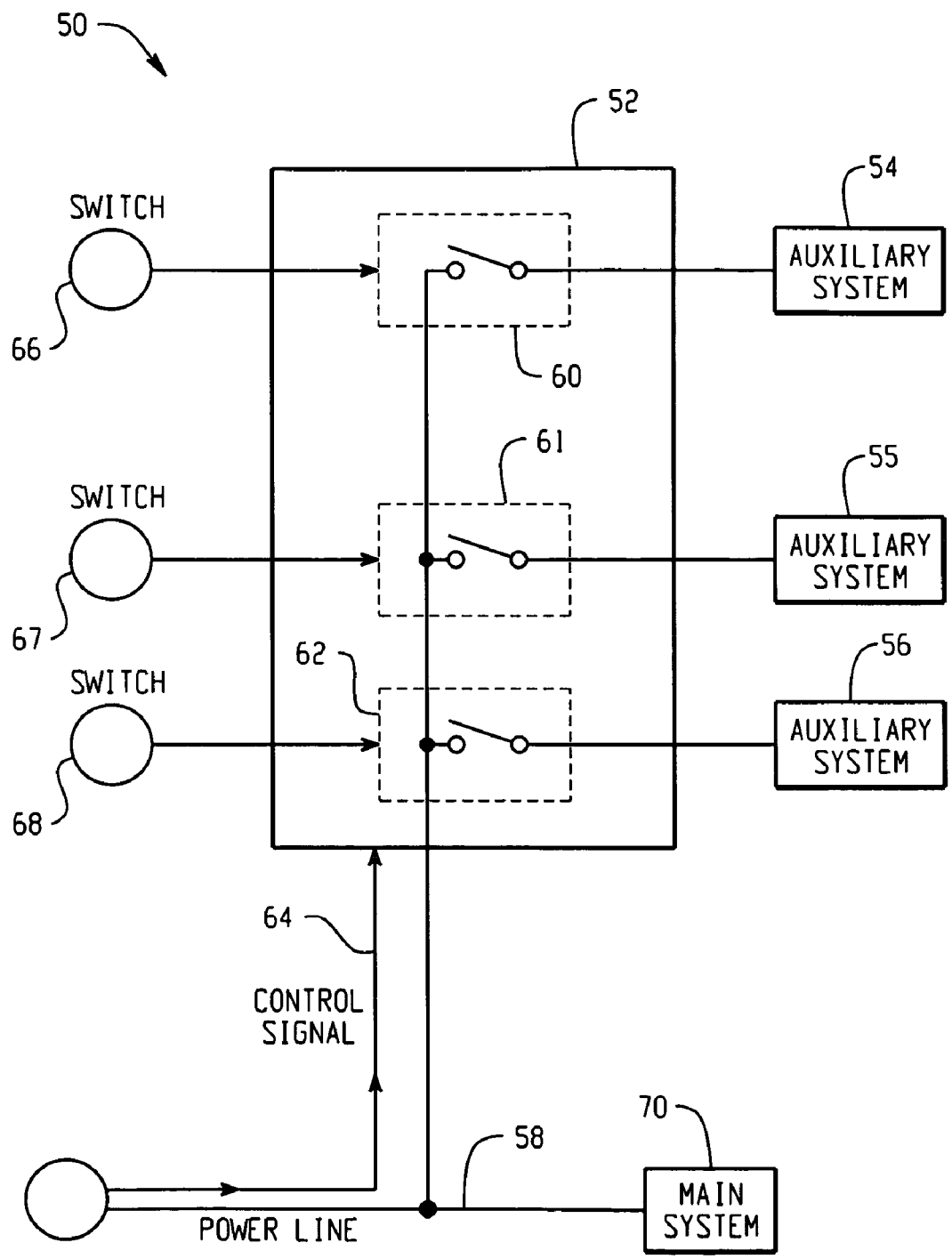
FIG. 3 is a block diagram of another example system for supplying power to a vehicle trailer.

FIG. 3 is a block diagram of another example system 50 for supplying power to a vehicle trailer. In this example, the control unit 52 switchably couples a plurality of auxiliary trailer electrical systems 54-56 to the vehicle power line 58. The control unit 52 includes a plurality of controlled switching devices 60-62 that each switchably couple one or the auxiliary trailer electrical systems 54-56 to the vehicle power line 58 based on both the control signal 64 and a signal from an auxiliary power switch 66-68. Each of the plurality of auxiliary trailer electrical systems 54-56 may be individually coupled to the vehicle power line 58 using a corresponding one of the auxiliary power switches 66-68, provided that the control signal 64 does not indicate that the vehicle is in motion or is about to be in motion. If the control signal 64 indicates that the vehicle is in motion or is about to be in motion, then the control unit 52 is configured to disconnect all of the auxiliary trailer electrical systems 54-56 from the vehicle power line 58, providing full power to the main trailer electrical system 70. The auxiliary trailer electrical systems 54-56 may also be manually disconnected from the vehicle power line 58 using the auxiliary power switches 66-68.

Figure 4:
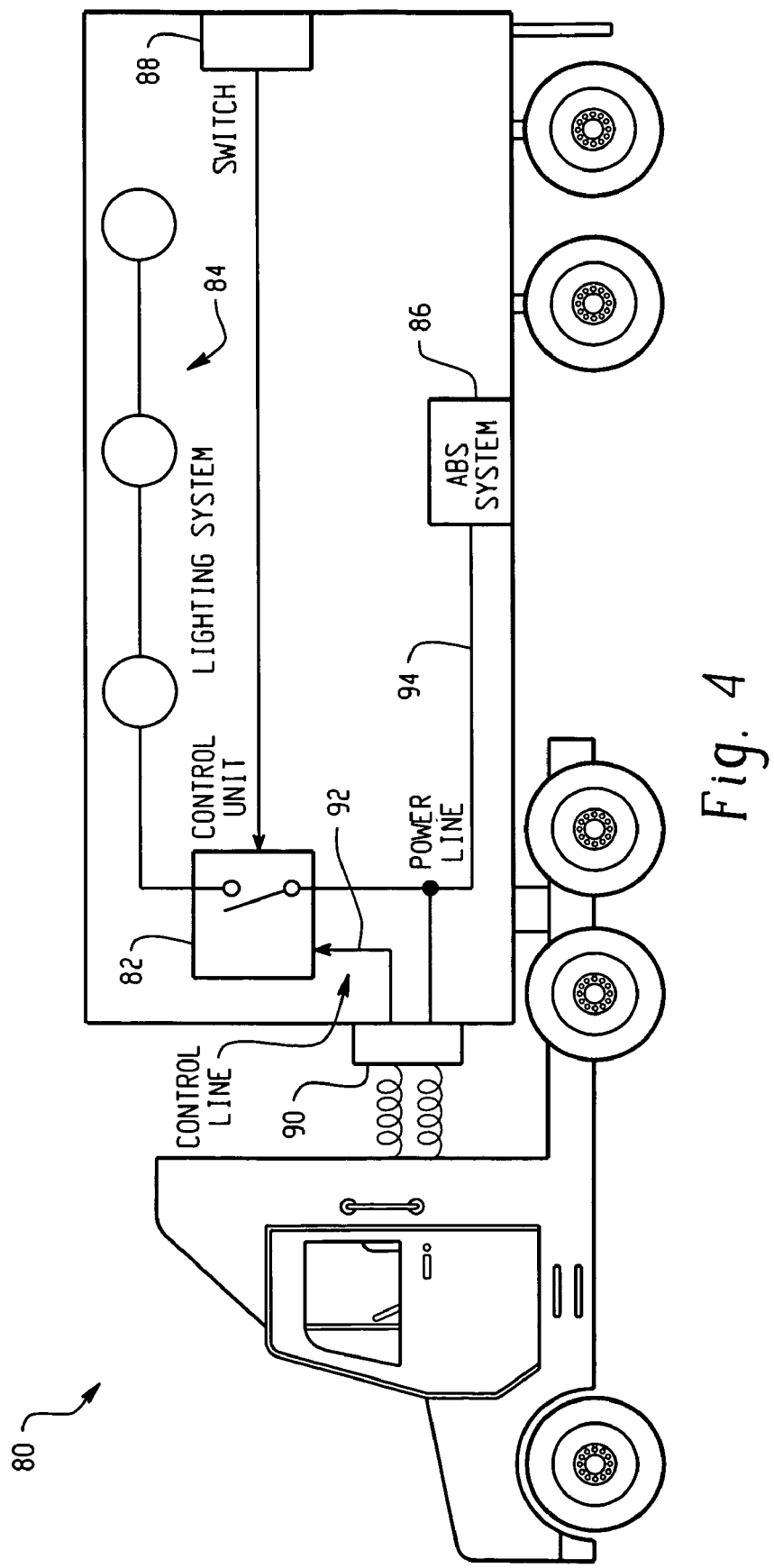
FIG. 4 depicts an example trailer having a power supply system.

FIG. 4 depicts an example trailer 80 having a power supply system, as described herein. In this example, the auxiliary trailer power system is a trailer lighting system 84 and the main trailer power system is an ABS control module 86. The trailer 80 includes a control unit 82, a lighting system 84, an ABS system 86, a switching circuit 88, and a connection device 90.

The connection device 90 is configured to connect the vehicle trailer to a vehicle power line 94 and a control line 92. The connection device 90 may, for example, be a SAE J560 socket attached to the junction box of the trailer. The ABS system 86 is coupled to the connection device 90, and receives power from the vehicle power line 94. The control unit 82 is coupled to the connection device 90 and the switching circuit 88, and switchably couples the lighting system 84 to the vehicle power line 94 based on both a control signal 92 and a signal from the switching circuit 88. The switching circuit 88 may, for example, be connected to the interior of the trailer, may be attached to the housing of the connection device 90, or may be positioned at another location on the trailer 80.

In operation, the control unit 82 connects the lighting system 84 to the vehicle power line 94 when the switching circuit 88 is activated, provided that the control signal 92 does not indicate that the vehicle is in motion or is about to be in motion. The control unit 82 then disconnects the lighting system 84 from the vehicle power line 94, providing full power to the ABS system 86, if either the switching circuit 88 is deactivated or the control signal 92 indicates that the vehicle is in motion or is about to be in motion. For example, if the control signal 92 is a brake light signal, then the control unit 82 may disconnect the lighting system 84 from the vehicle power line 94 is the brake light signal is activated.

In other examples, the control unit 82 may also include a timing circuit, a power line voltage monitoring circuit, and/or some other type of circuit that is configured to disconnect the lighting system 84 from the vehicle power line 94 based on some predetermined condition or occurrence (e.g., after a timer period has expired, if the power line voltage falls below a predetermined threshold level, etc.).

Figure 5:
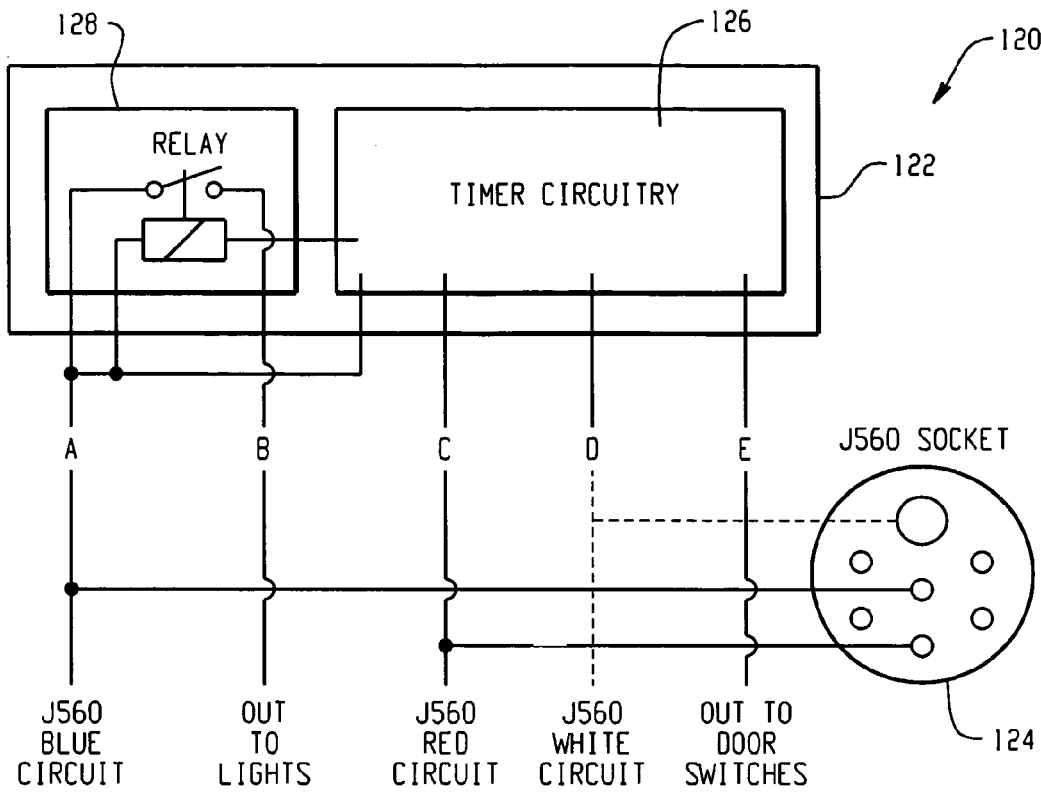
FIG. 5 depicts an example control unit and connection device for a system for supplying power to a vehicle trailer.

FIG. 5 depicts an example control unit 122 and connection device for a system for supplying power to a vehicle trailer. The control unit 122 includes a timer circuit 126, a controlled switching device 128 (e.g., a relay), and five input/output pins (labeled A-E). Also illustrated is a connection device 124, which, for example, may be a J560 socket, an ISO3731 socket, or other suitable connection device.

The switching device 128 is controlled by the timer circuitry 126, and switchably connects the auxiliary trailer electrical system (e.g., trailer lights) at pin B to the vehicle power line at pin A. As illustrated, the vehicle power line (pin A) may be the blue power wire on a standard J560 socket 124. The timer circuitry 126 receives a control signal at pin C and an auxiliary power switch signal at pin E. The control signal (pin C) may be received from the red brake light line on a standard J560 socket 124. The auxiliary power switch signal (pin E) may be received from one or more auxiliary power switches, for example located in the interior or the trailer and/or attached to the housing of the control unit 122. Pin D is a ground connection, for example from the white ground wire on a typical J560 socket 124.

In operation, the timer circuit 126 causes the switching device 128 to connect the auxiliary trailer electrical system (pin B) to the vehicle power line (pin A) when the auxiliary power switch (pin E) is activated. In addition, once the auxiliary power switch (pin E) is activated, the timer circuit 126 begins counting a preset timer period. The timer period for the timer circuitry 126 may, for example, be preset by the device manufacturer, be set by a user input (e.g., by selecting from variable timer settings), or be set by some other suitable means. The timer circuit 126 then causes the switching device 128 to disconnect the auxiliary trailer electrical system (pin B) from the vehicle power line (pin A) when either (1) the timer period expired, (2) the auxiliary power switch (pin E) is deactivated, or (3) a control signal (pin C) is received indicating that the vehicle is in motion or is about to be in motion (e.g., a brake light signal is received).

Figure 6:
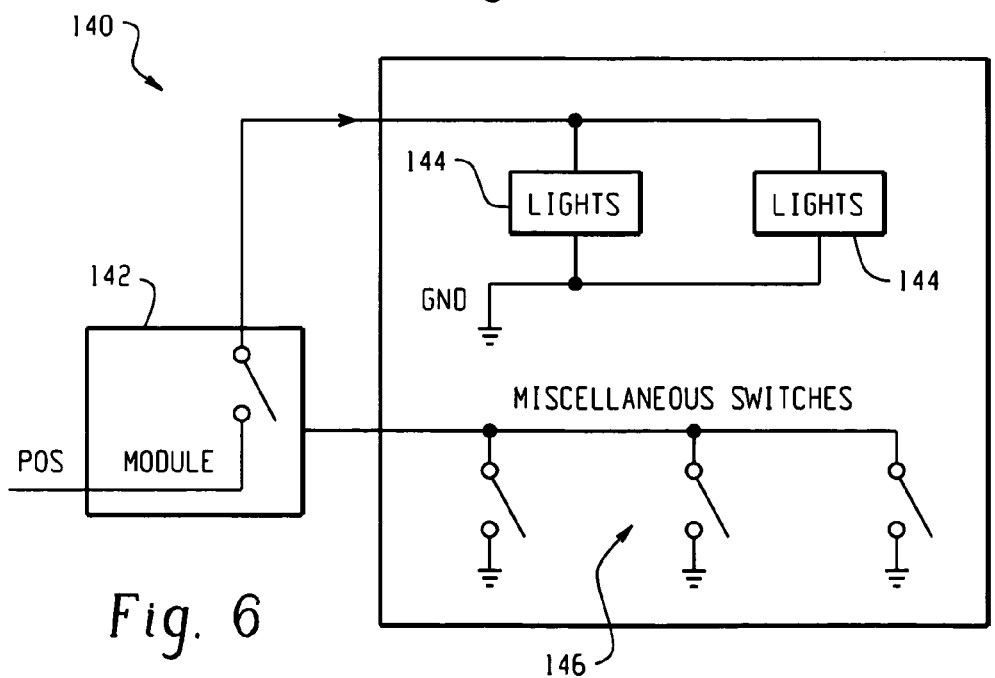
FIG. 6 depicts a circuit diagram illustrating one example switching configuration for a system for supplying power to a vehicle trailer.

FIG. 6 depicts a circuit diagram 140 illustrating one example switching configuration for a system for supplying power to a vehicle trailer. Show in the diagram 140 are a control unit 142, a trailer lighting system 144, and auxiliary power switches 146. As illustrated, the interior cargo lights 144 may be coupled between a power output pin of the control unit 142 and a ground potential, and the auxiliary power switches 146 may be coupled between an input pin of the control unit 142 and a ground potential. The control unit 142 is operable to switchably couple the interior cargo lights 144 to a positive power line at its power input terminal. In another example, the interior cargo lights may instead be coupled between a positive power line and the control unit 142, and the control unit 142 may switchably connect the lights 144 to a ground potential.

Figure 7:
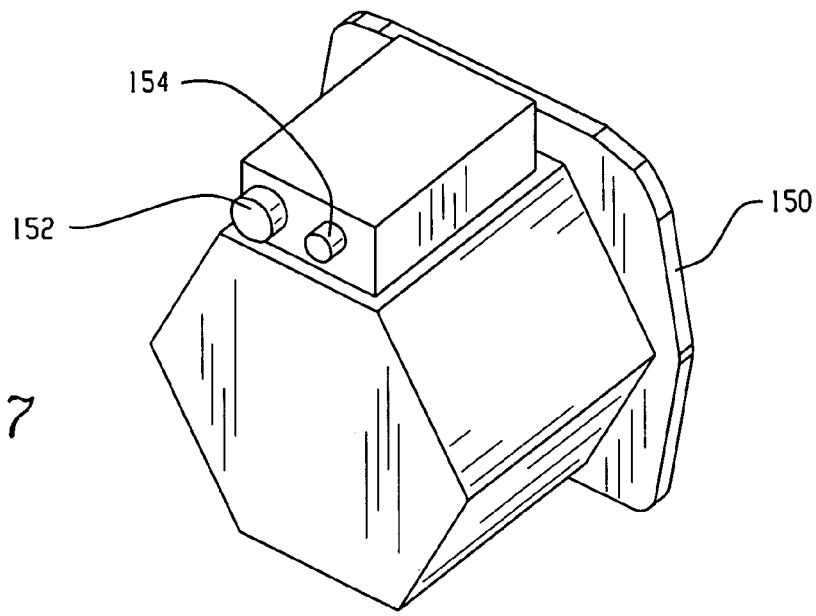
FIG. 7 depicts an example housing for a control unit.

FIG. 7 depicts an example housing 150 for a control unit. Mounted on the housing is an auxiliary power switch 152 and a power-on indicator light 154. The housing 150 may, for example, be overmolded in PVC or housed in a similar weatherproof enclosure, and includes a wire bundle for making connections to the control unit (e.g., inside a junction box).

Figure 8:
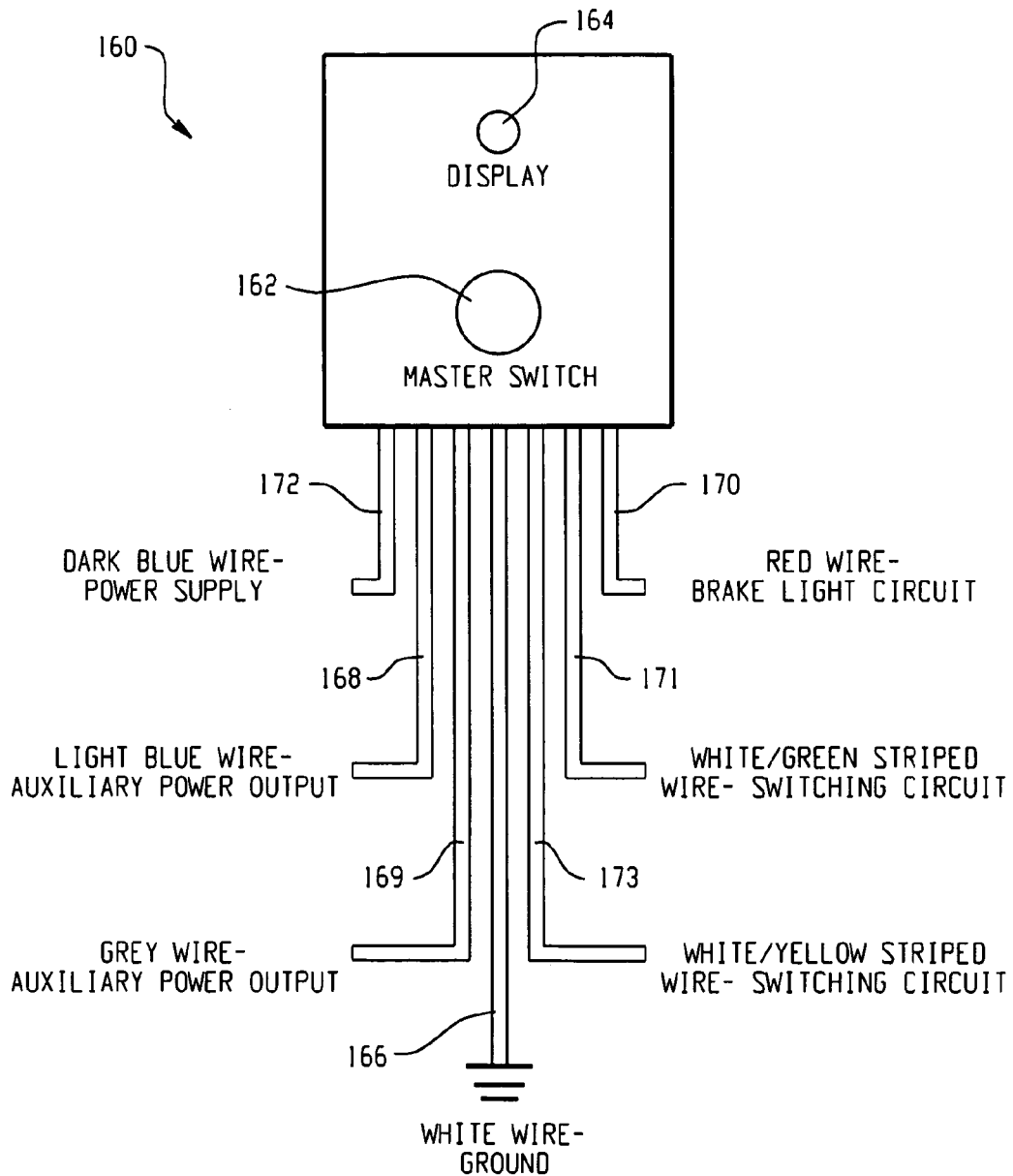
FIG. 8 is a schematic diagram of an example housing for a control unit.

FIG. 8 is a schematic diagram of an example housing for a control unit 160. The control unit 162 includes an auxiliary power switch 162 and a display 164 mounted on the housing. Also illustrated are seven wires 166, 168, 169, 170, 171, 172, 173 connected to the control unit 160. The wires may, for example, include a connection 172 (e.g., a dark blue wire) to the vehicle power line, a connection 170 (e.g., a red wire) to a brake light line, a ground connection 166 (e.g., a white wire), one or more auxiliary power outputs 168, 169 (e.g., a light blue and grey wire), and one or more connections 171, 173 (e.g., white/green and white/yellow striped wires) to auxiliary power switching circuits. The display 164 may, for example, be a power light that indicates whether one or more of the auxiliary power output lines 168, 169 are activated. In another example, the display 164 may provide additional information, such as a low voltage and/or high current warning indication.

Figure 9:
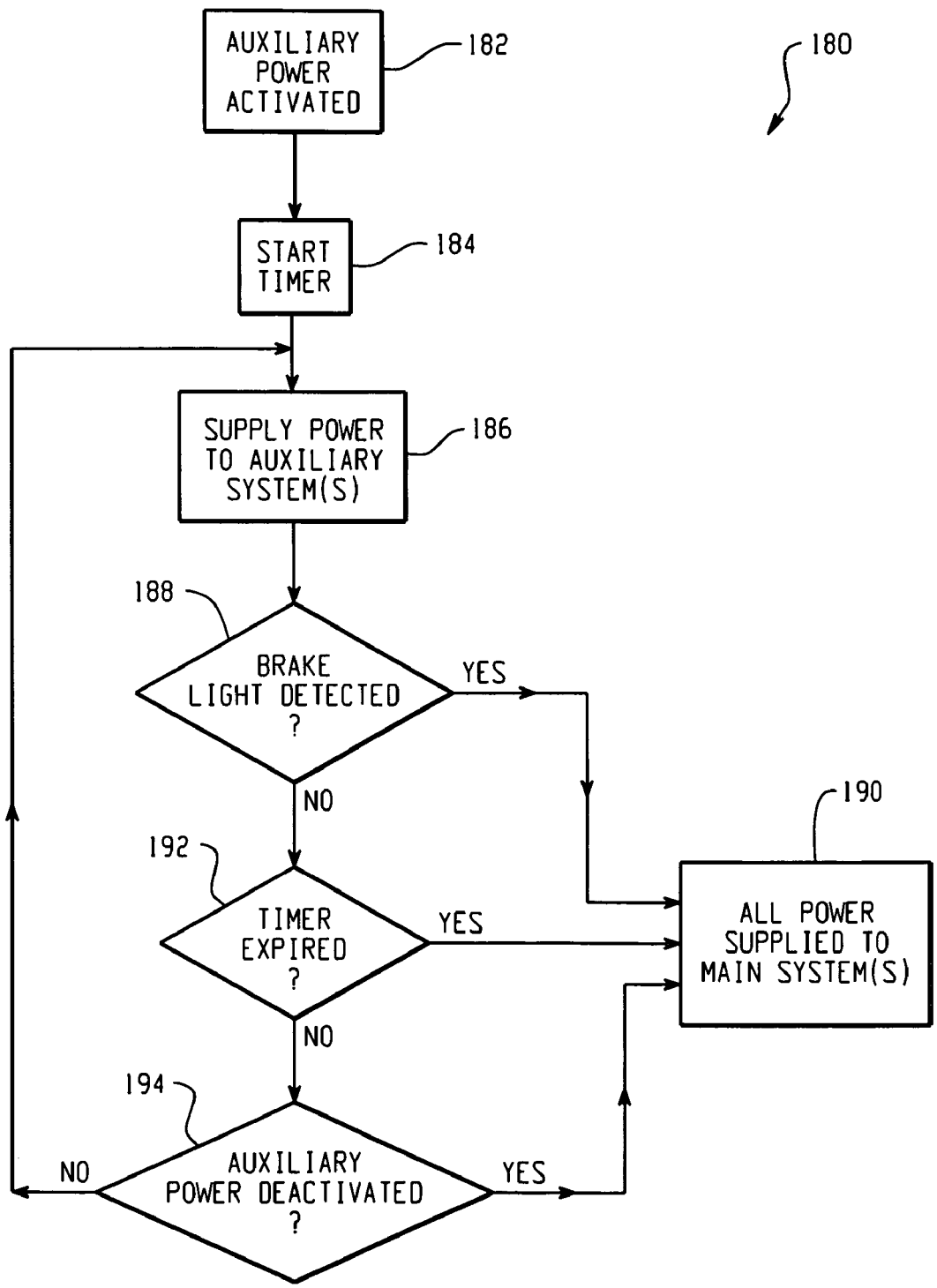
FIG. 9 is a flow diagram depicting an example method for supplying power to a vehicle trailer.

FIG. 9 is a flow diagram depicting an example method 180 for supplying power to a vehicle trailer. At step 182, auxiliary power is activated, for example by depressing a momentary switch or by closing or opening a non-momentary switch. Upon activating auxiliary power, the method begins counting a preset timer period. Then, in step 186, power is supplied to one or more auxiliary trailer electrical systems, such as interior cargo lights.

In step 188, the method determines if a brake light signal has been activated. If the brake light signal is detected, then the method proceeds to step 190. Otherwise, if no brake light signal is detected, then the method continues to step 192. In step 192, the method determines if the preset timer period has expired. If the timer period has expired, then the method proceeds to step 190. If the timer period has not expired, then the method continues to step 194. In step 194, the method determines if auxiliary power has been deactivated, for example by depressing a momentary switch or by closing or opening a non-momentary switch. If auxiliary power has been deactivated, then the method proceeds to step 190, else the method returns to step 186. In step 190, power is disconnected from the one or more auxiliary trailer electrical systems, causing full power to be supplied to one or more main trailer electrical systems.

It should be understood that similar to other processing flows described herein, one or more of the steps and the order in the flowchart may be altered, deleted, modified and/or augmented and still achieve the desired outcome.

Figure 10:
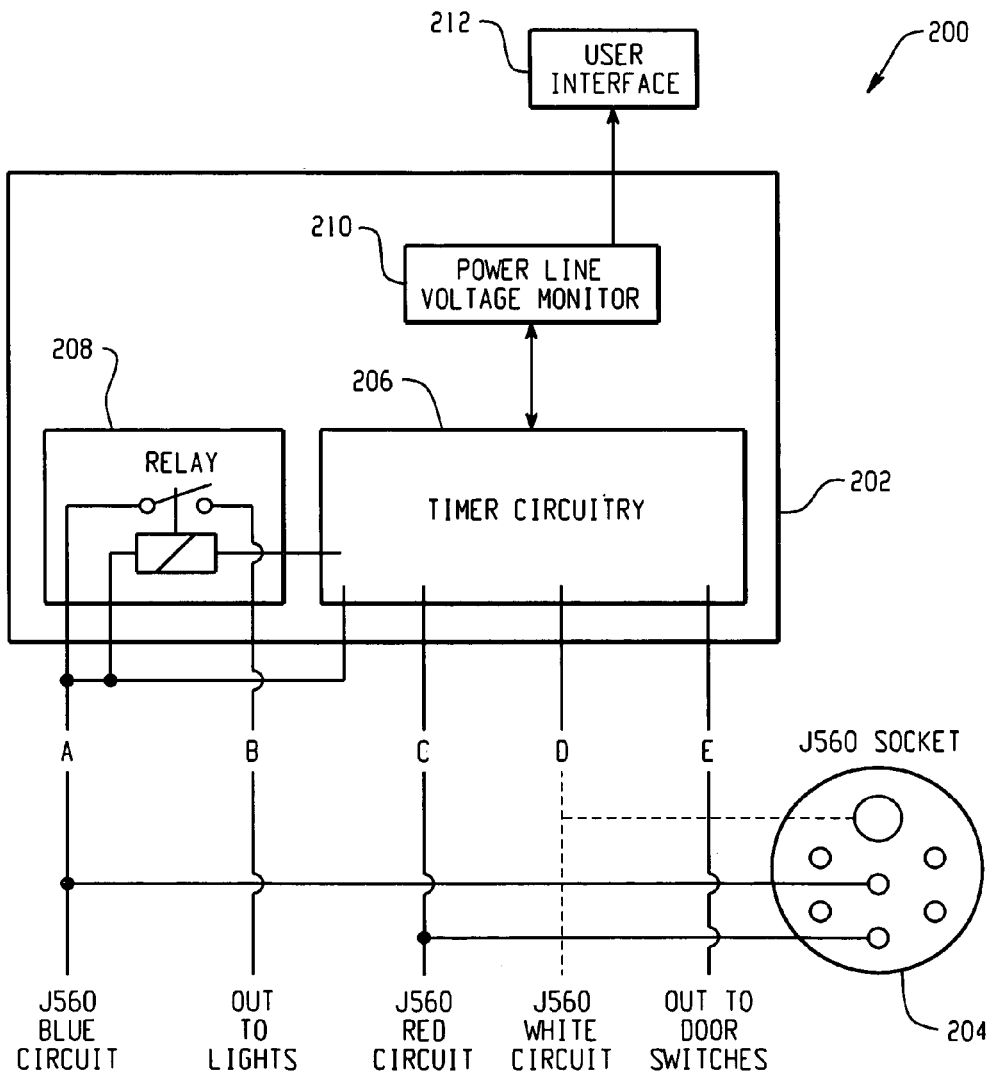
FIG. 10 depicts another example control unit.

FIG. 10 depicts another example control unit 202. In this example 200 the control unit 202 also includes a power line voltage monitor circuit 210 coupled to the time circuitry 206, which is configured to monitor the voltage level of the vehicle power line (pin A). Also illustrated is a user interface 212 for generating an output based on the measured voltage level.

In operation, the power line voltage monitor circuit 210 causes the timer circuitry 206 to disconnect the auxiliary trailer electrical system (pin B) from the vehicle power line (pin A) if the measured voltage on the vehicle power line (pin A) falls below a predetermined shut off voltage (e.g., 9.75 V). In addition, the power line voltage monitor circuit 210 may generate an output on the user interface 212 based on the state of the measured voltage. For example, if the measured voltage on the vehicle power line (pin A) is greater than or equal to the predetermined shut off voltage, then the user interface 212 may display a steady (e.g., constantly on) green light, and if the measured voltage is below the predetermined shut off voltage, then the user interface 212 may display a flashing red light.

In another example, the power line voltage monitor circuit 210 may also display a warning indicator on the user interface 212 if the measured voltage on the vehicle power line (pin A) falls below a predetermined warning voltage (e.g., 10 V). For example, the user interface 212 may display a steady green light if the measured voltage is greater than or equal to the warning voltage, display a steady red light if the measured voltage is less than the warning voltage and greater than or equal to the shut off voltage, and display a red flashing light if the measured voltage is less than the shut off voltage.

In yet another example, the power line voltage monitor circuit 210 may monitor the current in the vehicle power line (pin A) and cause the timer circuitry 206 to disconnect the auxiliary trailer electrical system (pin B) from the vehicle power line (pin A) if the measured current in the vehicle power line (pin A) is above a predetermined shut off current. In addition, the power line voltage monitor circuit 210 may display a first indicator (e.g., a green light) on the user interface 212 if the measured current is below the predetermined shut off current, and display a second indictor (e.g., a purple light) if the measured current is above the predetermined shut off current.

Figure 11:
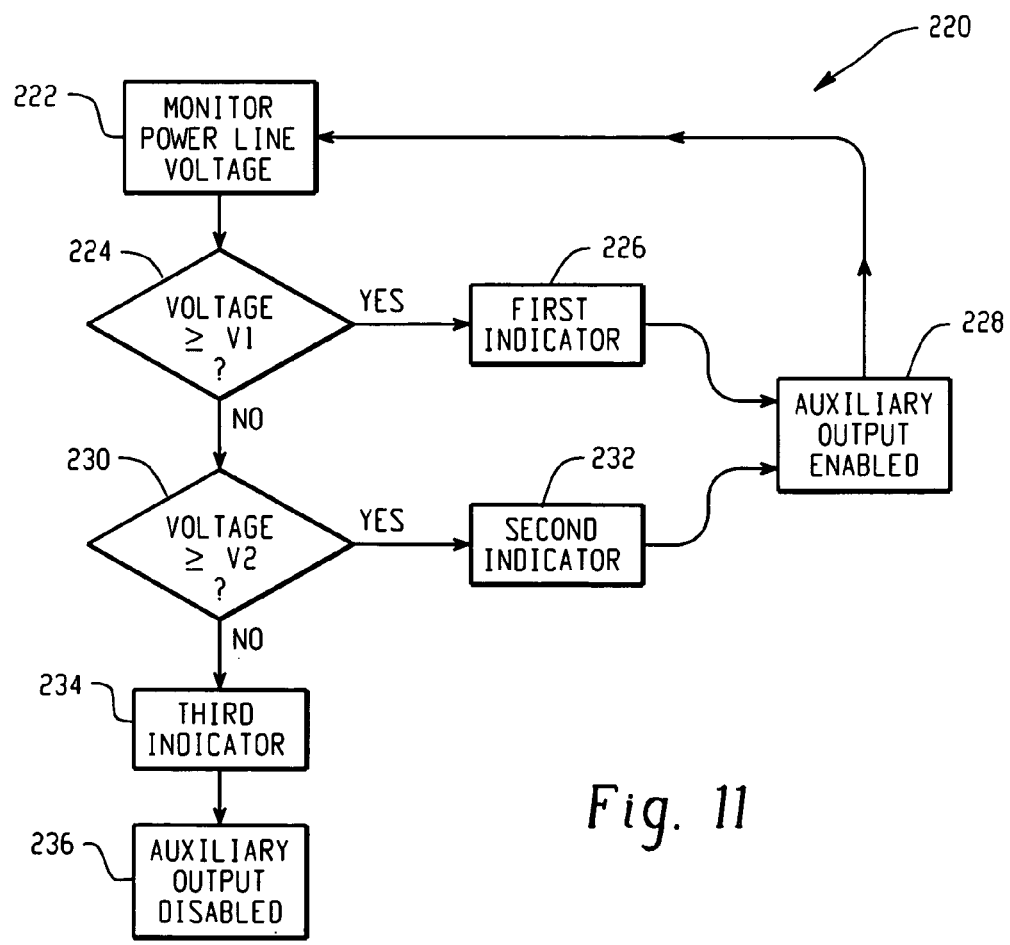
FIG. 11 is a flow diagram of an example method for controlling the auxiliary power in a vehicle trailer based on a measured voltage on the vehicle power line.

FIG. 11 is a flow diagram of an example method 220 for controlling the auxiliary power in a vehicle trailer based on a measured voltage on the vehicle power line. This illustrated method 220 may, for example, be used independently or in combination with one or more steps of the example method 180 depicted in FIG. 9.

In step 220, the voltage level on the vehicle power line is measured. The method 220 then determines at step 224 whether the measured voltage is greater than or equal to a first voltage threshold (V1). If the measured voltage is greater than or equal to the first voltage threshold (V1), then a first indicator is generated at step 226, the auxiliary power in enabled at step 228, and the method returns to step 222. For example, the first indicator displayed in step 226 may be a green light, or some other indication that the measured voltage is above a warning voltage level. Otherwise, if the measured voltage is less than the first voltage threshold (V1), then the method 220 proceeds to step 230.

In step 230, the method 220 determines whether the measured voltage is greater than or equal to a second voltage threshold (V2). If the measured voltage is greater than or equal to the second voltage threshold (V2), then a second indicator is generated at step 232, the auxiliary power in enabled at step 228, and the method returns to step 222. For example, the second indicator displayed in step 232 may be a steady red light, a yellow light, or some other indication that the measured voltage is between a warning voltage level and a shut off voltage level.

If the measured voltage is below the second voltage threshold (V2), then a third indicator is generated at step 234, and the auxiliary power is disabled at step 236. For example, the third indicator displayed at step 236 may be a flashing red light, or some other indication that the measured voltage is below a shut off voltage level.

This written description uses examples to disclose the invention, including the best mode, and also to enable a person skilled in the art to make and use the invention. The patentable scope of the invention may include other examples that occur to those skilled in the art.

It is claimed:

1. A system for supplying power to a vehicle trailer, comprising:
   a connection device configured to connect the vehicle trailer to a vehicle power line and to a control line from a vehicle electrical system;
   a main trailer electrical system coupled to the connection device that receives power from the vehicle power line, wherein the main trailer electrical system requires power only when the vehicle trailer is in motion;
   an auxiliary trailer electrical system; and
   a control unit coupled to the connection device that receives a control signal from the control line and that switchably couples the auxiliary trailer electrical system to the vehicle power line based on the control signal.

2. The system of claim 1, wherein the vehicle electrical system includes a brake light circuit and the control signal is a brake light signal.

3. The system of claim 2, wherein the control unit is configured to disconnect the auxiliary trailer electrical system from the vehicle power line when the brake light signal is activated.

4. The system of claim 1, wherein the control signal indicates a current speed of the trailer, and wherein the control unit is configured to disconnect the auxiliary trailer electrical system from the vehicle power line when the control signal indicates that the current speed of the trailer is greater than zero.

5. The system of claim 1, wherein the main trailer electrical system includes an antilock braking system (ABS).

6. The system of claim 1, wherein the auxiliary trailer electrical system includes a trailer lighting system.

7. The system of claim 1, further comprising:
   an auxiliary power switch coupled to the control unit;
   wherein the control unit switchably couples the auxiliary trailer electrical system to the vehicle power line based on the control signal and a signal from the auxiliary power switch.

8. The system of claim 7, further comprising:
   one or more additional auxiliary trailer electrical systems; and
   one or more additional auxiliary power switches coupled to the control unit;
   wherein the control unit switchably couples each of the additional auxiliary trailer electrical systems to the vehicle power line based on the control signal and a signal from one of the additional auxiliary power switches.

9. The system of claim 1, wherein the control unit includes a timer circuit configured to count a preset timer period when the auxiliary trailer electrical system is coupled to the vehicle power line, and wherein the control unit is configured to disconnect the auxiliary trailer electrical system from the vehicle power line when the preset timer period expires.

10. The system of claim 1, wherein the control unit includes a power line voltage monitor circuit configured to monitor a voltage level of the vehicle power line and to disconnect the auxiliary trailer electrical system from the vehicle power line if the voltage level of the vehicle power line falls below a predetermined shut off voltage level.

11. The system of claim 10, further comprising:
    a user interface for displaying information to a system user;
    wherein the power line voltage monitor circuit is further configured to cause the user interface to display a first indicator if the voltage level of the vehicle power line is greater than the predetermined shut off voltage level and display a second indictor if the voltage level of the vehicle power line is less than the predetermined shut off voltage level.

12. The system of claim 11, wherein the first indicator is a steady green light and the second indicator is a flashing red light.

13. The system of claim 10, further comprising:
    a user interface for displaying information to a system user;
    wherein the power line voltage monitor circuit is further configured to cause the user interface to display a first indicator if the voltage level of the vehicle power line is greater than a predetermined warning voltage level, to display a second indicator if the voltage level of the vehicle power line is less then the predetermined warning voltage level and greater than the predetermined shut off voltage level, and to display a third indicator if the voltage level of the vehicle power line is below the predetermined shut off voltage level.

14. The system of claim 13, wherein the first indicator is a steady green light, the second indicator is a steady red light, and the third indicator is a flashing red light.

15. A method for supplying power to a vehicle trailer, comprising:
    receiving a signal to activate auxiliary power in the trailer;
    in response to receiving the signal to activate auxiliary power, coupling an auxiliary trailer electrical system to a vehicle power line, the vehicle power line also supplying power to a main trailer electrical system when the vehicle trailer is in motion;
    monitoring a control line for a brake light signal; and if the brake light signal is detected, then disconnecting the auxiliary trailer electrical system from the vehicle power line to supply full power to the main trailer electrical system.

16. The method of claim 15, further comprising:

activating a timer when the auxiliary trailer electrical system is coupled to the vehicle power line, the timer being configured to count a preset timer period;

monitoring the timer to detect when the preset timer period has expired; and if the preset time period expires and the auxiliary trailer electrical system is coupled to the vehicle power line, then disconnecting the auxiliary trailer electrical system from the vehicle power line.

17. The method of claim 15, further comprising:

receiving a signal to deactivate the auxiliary power in the trailer; and in response to receiving the signal to deactivate the auxiliary power, disconnecting the auxiliary trailer electrical system from the vehicle power line.

18. A control unit for use in a system for supplying power to a vehicle trailer, the system including a main trailer electrical system that receives power from a vehicle power line and an auxiliary trailer electrical system, the control unit comprising:

a controlled switching device configured to switchably couple the auxiliary trailer electrical system to the vehicle power line;

a timer circuit coupled to an auxiliary power switch and to a brake light line;

the timer circuit being configured to cause the controlled switching device to connect the auxiliary trailer electrical system to the vehicle power line in response to receiving a signal from the auxiliary power switch; and the timer circuit being further configured to cause the controlled switching device to disconnect the auxiliary trailer electrical system from the vehicle power line in response to receiving a brake light signal on the brake light line.

19. The control unit of claim 18, wherein the timer circuit is further configured to count a preset timer period when the auxiliary trailer electrical system is coupled to the vehicle power line, and cause the controlled switching device to disconnect the auxiliary trailer electrical system from the vehicle power line when the preset timer period expires.

20. The control unit of claim 18, wherein the controlled switching device is a relay.

21. The control unit of claim 18, wherein the main trailer electrical system includes an antilock braking system (ABS).

22. The control unit of claim 18, wherein the auxiliary trailer electrical system includes interior cargo lights.

23. A vehicle trailer, comprising:

a connection device configured to connect the vehicle trailer to a vehicle power line and to a brake light line;

a braking system coupled to the connection device that receives power from the vehicle power line;

a trailer lighting system that includes one or more interior cargo lights;

an auxiliary switching circuit; and a control unit coupled to the connection device and the auxiliary switching circuit, and configured to switchably connect the trailer lighting system to the vehicle power line;

the control unit being configured to connect the trailer lighting system to the vehicle power line in response to receiving a signal from the auxiliary switching circuit; and the control unit being configured to disconnect the trailer lighting system from the vehicle power line in response to receiving a brake light signal from the brake light line.

* * * * *

UNITED STATES PATENT AND TRADEMARK OFFICE
CERTIFICATE OF CORRECTION

PATENT NO. : 7,286,046 B2 Page 1 of 1
APPLICATION NO. : 11/141242
DATED : October 23, 2007
INVENTOR(S) : Kinsey et al.

It is certified that error appears in the above-identified patent and that said Letters Patent is hereby corrected as shown below:

Column 8, line 37, delete "indictor" and insert -- indicator --.

Signed and Sealed this

Eighteenth Day of December, 2007

JON W. DUDAS
*Director of the United States Patent and Trademark Office*